(12) United States Patent
Jetley et al.

(10) Patent No.: US 9,830,529 B2
(45) Date of Patent: Nov. 28, 2017

(54) END-TO-END SALIENCY MAPPING VIA PROBABILITY DISTRIBUTION PREDICTION

(71) Applicant: Xerox Corporation, Norwalk, CT (US)

(72) Inventors: Saumya Jetley, Oxford (GB); Naila Murray, Grenoble (FR); Eleonora Vig, Munich (DE)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/138,821

(22) Filed: Apr. 26, 2016

(65) Prior Publication Data

US 2017/0308770 A1    Oct. 26, 2017

(51) Int. Cl.
  *G06K 9/00*    (2006.01)
  *G06E 1/00*    (2006.01)
  *G06K 9/46*    (2006.01)
  *G06K 9/62*    (2006.01)

(52) U.S. Cl.
  CPC ......... *G06K 9/4671* (2013.01); *G06K 9/6256* (2013.01)

(58) Field of Classification Search
  CPC ...... G06K 9/4671; G06K 9/6256; G06K 9/66; G06K 9/4628; G06K 9/32; G06K 9/00127; G06K 9/00456
  USPC ......... 382/103, 156, 195, 165, 197; 348/E5.031; 706/18, 20; 351/246; 707/E17.07
  See application file for complete search history.

(56) References Cited

U.S. PATENT DOCUMENTS

| | | | | |
|---|---|---|---|---|
| 6,324,532 B1* | 11/2001 | Spence | ................ | G06K 9/3241 706/19 |
| 6,993,452 B2* | 1/2006 | Huang | .................... | G06F 17/18 702/110 |
| 8,175,376 B2* | 5/2012 | Marchesotti | ...... | G06F 17/30256 382/159 |
| 8,385,654 B2* | 2/2013 | Gu | ....................... | G06K 9/4628 382/103 |
| 9,131,204 B2* | 9/2015 | Stankiewicz | ........ | G06K 9/4628 |
| 2005/0047647 A1* | 3/2005 | Rutishauser | ......... | G06K 9/3233 382/159 |
| 2010/0226564 A1 | 9/2010 | Marchesotti et al. | | |
| 2010/0281361 A1 | 11/2010 | Marchesotti | | |
| 2015/0339589 A1* | 11/2015 | Fisher | .................. | G06N 99/005 706/12 |

OTHER PUBLICATIONS

U.S. Appl. No. 14/861,386, filed Sep. 22, 2015, Rodriguez-Serrano et al.
(Continued)

*Primary Examiner* — Sheela C Chawan
(74) *Attorney, Agent, or Firm* — Fay Sharpe LLP

(57) ABSTRACT

A method for generating a system for predicting saliency in an image and method of use of the prediction system are described. Attention maps for each of a set of training images are used to train the system. The training includes passing the training images though a neural network and optimizing an objective function over the training set which is based on a distance measure computed between a first probability distribution computed for a saliency map output by the neural network and a second probability distribution computed for the attention map for the respective training image. The trained neural network is suited to generation of saliency maps for new images.

19 Claims, 12 Drawing Sheets

(56) References Cited

OTHER PUBLICATIONS

U.S. Appl. No. 14/793,434, filed Jul. 7, 2015, Gordo Soldevila, et al.
Achanta, et al., "Saliency detection for content-aware image resizing," 16th IEEE Int'l Conf. on Image Processing (ICIP), pp. 1001-1004 (2009).
Borji, et al., "State-of-the-art in Visual Attention Modeling," IEEE Trans. PAMI, pp. 185-207 (2013).
Bruce, et al., "Saliency Based on Information Maximization," NIPS, pp. 155-162 (2006).
Bylinskii, et al., "Mit saliency benchmark," pp. 1-3, downloaded on Apr. 27, 2016, from http://saliency.mit.edu/.
Cerf, et al., "Predicting human gaze using low-level saliency combined with face detection," NIPS, pp. 241-248 (2008).
Gilani, et al., "PET: an eye-tracking dataset for animal-centric Pascal object classes," 2015 IEEE Int'l Conf. on Multimedia and Expo (ICME), pp. 1-6 (2015).
Harel, et al., "Graph-based visual saliency," NIPS, pp. 545-552 (2006).
Hou, et al., "Image signature: Highlighting sparse salient regions" TPAMI, vol. 34(1), pp. 194-201 (2012).
Hou, et al., "Saliency detection: A spectral residual approach," CVPR, pp. 1-8 (2007).
Huang, et al., "SALICON: Reducing the semantic gap in saliency prediction by adapting deep neural networks," Proc. IEEE Int'l Conf. on Computer Vision, pp. 262-270 (2015).
Itti, et al., "Bayesian Surprise Attracts Human Attention," NIPS, pp. 547-554 (2006).
Itti, et al., "A model of saliency-based visual attention for rapid scene analysis," TPAMI, (11), pp. 1254-1259 (1998).
Itti, et al., "A saliency-based search mechanism for overt and covert shifts of visual attention," Vision research, vol. 40(10), pp. 1489-1506 (2000).
Jia, et al., "Caffe: Convolutional Architecture for Fast Feature Embedding," Proc. ACM Int'l Conf. on Multimedia, pp. 675-678 (2014).
Jiang, et al., "SALICON: Saliency in Context," CVPR, pp. 1072-1080 (2015).
Judd, et al., "A Benchmark of Computational Models of Saliency to Predict Human Fixations," MIT Computer Science and Artificial Intelligence Laboratory Technical Report, pp. 1-22 (2012).
Judd, et al., "Learning to predict where humans look," CVPR, pp. 2106-2113 (2009).
Kienzle, et al., "A Nonparametric Approach to Bottom-Up Visual Saliency," NIPS, pp. 405-414 (2007).
Koch, et al., "Shifts in selective visual attention: towards the underlying neural circuitry," Matters of intelligence, pp. 115-141 (1987).
Krizhevsky, et al., "Imagenet classification with deep convolutional neural networks," NIPS, pp. 1097-1105 (2012).
Kruthiventi, et al., "DeepFix: A Fully Convolutional Neural Network for predicting Human Eye Fixations," Technical report, arXiv:1510.02927, pp. 1-11 (2015).
Kummerer, et al., "Deep Gaze I: Boosting Saliency Prediction with Feature Maps Trained on ImageNet," ICLR Workshop, arXiv:1411.1045, pp. 1-12 (2015).
Lang, et al., "Depth Matters: Influence of Depth Cues on Visual Saliency," ECCV, pp. 101-115 (2012).
Lin, et al., "Microsoft COCO: Common objects in context," ECCV, pp. 740-755 (2014).
Liu, et al., "Saliency detection using regional histograms," Optics letters, 38(5):700-702, (2013).
Long, et al., "Fully Convolutional Networks for Semantic Segmentation," CVPR, pp. 3431-3440, (2015).
Luo, et al., "Label Consistent Quadratic Surrogate Model for Visual Saliency Prediction," CVPR, pp. 5060-5069 (2015).
Marchesotti, et al., "A framework for visual saliency detection with applications to image thumbnailing," ICCV, pp. 2232-2239 (2009).
Mathe, et al., "Action from still image dataset and inverse optimal control to learn task specific visual scanpaths," NIPS, pp. 1-9 (2013).
Murray, et al., "Low-level spatiochromatic grouping for saliency estimation," TPAMI, vol. 35(11), pp. 2810-2816 (2013).
Murray, et al., "Saliency estimation using a non-parametric low-level vision model," in CVPR, pp. 433-440 (2011).
Pan, et al., "End-to-end Convolutional Network for Saliency Prediction," Technical report, arXiv:1507.01422, pp. 1-6 (2015).
Ren, et al., "Faster R-CNN: Towards Real-Time Object Detection with Region Proposal Networks," NIPS, pp. 91-99 (2015).
Schauerte, et al., "Quaternion-Based spectral saliency detection for eye fixation prediction," ECCV, pp. 116-129 (2012).
Sharma, et al., "Discriminative spatial saliency for image classification," CVPR, pp. 3506-3513 (2012).
Shen, et al., "Learning High-Level Concepts by Training a Deep Network on Eye Fixations," NIPS Deep Learning and Unsupervised Feature Learning Workshop, pp. 1-9, (2012).
Simonyan, et al., "Very Deep Convolutional Networks for Large-Scale Image Recognition," arXiv preprint arXiv:1409.1556, pp. 1-14 (2014).
Stentiford, "Attention based auto image cropping," 5th Int'l Conf. on Computer Vision Systems, vol. 1, pp. 1-9 (2007).
Treisman, et al., "A feature-integration theory of attention," Cognitive Psychology, vol. 12(1), pp. 97-136 (1980).
Valenti, et al., "Image saliency by isocentric curvedness and color," ICCV, pp. 2185-2192 (2009).
Vig, et al., "Large-scale optimization of hierarchical features for saliency prediction in natural images," CVPR, pp. 2798-2805 (2014).
Xu, et al., "TurkerGaze: Crowdsourcing Saliency with Webcam based Eye Tracking," Technical report, arXiv:1504.06755v1, pp. 1-9 (2015).
Zhang, et al., "Saliency detection: A boolean map approach," ICCV, pp. 153-160 (2013).
Zhang, et al., "Sun: A Bayesian framework for saliency using natural statistics," Journal of Vision, vol. 8(7), pp. 1-20 (2008).
Zhang, et al., "Large-scale Scene Understanding Challenge: Eye Tracking Saliency Estimation," downloaded at http://lsun.cs.princeton.edu/leaderboard/#saliencysalicon, pp. 1-3 (Jun. 2015).
Zhao, et al., "Learning a saliency map using fixated locations in natural scenes," Journal of Vision, vol. 11(3), pp. 1-15 (2011).

* cited by examiner

END-TO-END SALIENCY MAPPING VIA PROBABILITY DISTRIBUTION PREDICTION

BACKGROUND

The exemplary embodiment relates to visual attention prediction, and in particular, to the prediction of a topographic visual saliency map when given an input image.

Visual attention has been often used in computer vision as a pre-processing step in order to focus subsequent processing on regions of interest in images. This has proved particularly useful as vision models and datasets increase in size. Saliency map prediction finds application in tasks such as automatic image cropping (Stentiford, F., "Attention based auto image cropping," 5th Intl Conf. on Computer Vision Systems, pp. 1-9, 2007) and content aware image resizing (Achanta, R., et al., "Saliency detection for content-aware image resizing," 16th IEEE Int'l Conf. on Image Processing (ICIP), pp. 1001-1004, 2009), image thumbnailing (Marchesotti, L., et al., "A framework for visual saliency detection with applications to image thumbnailing," ICCV, pp. 2232-2239, 2009), object recognition (Gilani, S., et al., "PET: an eye-tracking dataset for animal-centric Pascal object classes," 2015 IEEE Intl Conf. on Multimedia and Expo (ICME), pp. 1-6, 2015), and fine-grained, scene, and human action classification (Sharma, G., et al., "Discriminative spatial saliency for image classification," CVPR, pp. 3506-3513, 2012).

Some traditional saliency detection methods have focused on designing models that explicitly model biological systems (Itti, L, et al., "A model of saliency-based visual attention for rapid scene analysis," TPAMI, (11):1254-1259, 1998). Others have used data-driven approaches to learn patch-level classifiers which give a local image patch a "saliency score," using eye-fixation data to derive training labels (Kienzle, W., et al., "A Nonparametric Approach to Bottom-Up Visual Saliency," NIPS, pp. 405-414, 2007; Judd, T., et al., "Learning to predict where humans look. CVPR, pp. 2106-2113, 2009, hereinafter, "Judd 2009"). Hierarchical models have also been used to extract saliency maps, with model weights being learned in a supervised manner. Recently, neural network architectures developed for semantic annotation tasks such as categorization and object localization have been adapted to use as attentional models (Kümmerer, M., et al., "Deep Gaze I: Boosting Saliency Prediction with Feature Maps Trained on ImageNet," ICLR Workshop, arXiv:1411.1045, pp. 1-12, 2015; and Pan, J., et al., "End-to-end Convolutional Network for Saliency Prediction," Technical report, arXiv:1507.01422, pp. 1-6, 2015). This approach has benefitted from the availability of large visual attention datasets (Jiang, M., et al., "SALICON: Saliency in Context," CVPR, pp. 1072-1080, 2015, hereinafter, "Jiang 2015"; and Xu, P., et al., "TurkerGaze: Crowdsourcing Saliency with Webcam based Eye Tracking," Technical report, arXiv:1504.06755v1, pp. 1-9, 2015). These deep methods, however, have used loss functions more suited to semantic tasks, such as classification or regression losses.

INCORPORATION BY REFERENCE

The following references, the disclosures of which are incorporated herein by reference in their entireties, are mentioned:

U.S. Pub. No. 20100226564, published Sep. 9, 2010, entitled FRAMEWORK FOR IMAGE THUMBNAILING BASED ON VISUAL SIMILARITY, by Luca Marchesotti, et al.

U.S. Pub. No. 20100281361, published Nov. 4, 2010, entitled AUTOMATED METHOD FOR ALIGNMENT OF DOCUMENT OBJECTS, by Luca Marchesotti.

U.S. application Ser. No. 14/861,386, filed on Sep. 22, 2015, entitled SIMILARITY-BASED DETECTION OF PROMINENT OBJECTS USING DEEP CNN POOLING LAYERS AS FEATURES, by Jose Antonio Rodriguez-Serrano, et al.

U.S. application Ser. No. 14/793,434, filed on Jul. 7, 2015, entitled EXTRACTING GRADIENT FEATURES FROM NEURAL NETWORKS, by Albert Gordo Soldevila, et al.

BRIEF DESCRIPTION

In accordance with one aspect of the exemplary embodiment, a method for generating a system for predicting saliency in an image includes generating an attention map for each of a set of training images and training a neural network with the training images and the attention maps to optimize an objective function over the training set which is based on a distance measure computed between a first probability distribution computed for a saliency map output by the neural network and a second probability distribution computed for the attention map of the respective training image.

One or more steps of the method may be performed with a processor.

In accordance with another aspect of the exemplary embodiment, a training system for generating a prediction system for predicting saliency in an image includes memory which stores an attention map for each of a set of training images. Each attention map has been generated based on eye gaze data. A training component trains a neural network with the training images and the attention maps to optimize an objective function over the training set which is based on a distance measure computed between a first probability distribution computed for a saliency map output by the neural network and a second probability distribution computed for the attention map of the respective training image. A processor implements the training component.

In accordance with another aspect of the exemplary embodiment, a method for predicting saliency in an image, includes providing a trained neural network which has been trained by a method including generating an attention map for each of a set of training images, and training a neural network with the training images and the attention maps to optimize an objective function over the training set which is based on a distance measure computed between a first probability distribution computed for the attention map and a second probability distribution computed for a saliency map output by the neural network for the respective training image. An image is received and passed through the neural network to generate a saliency map for the image.

One or more of the steps of the method may be performed with a processor.

DETAILED DESCRIPTION

Aspects of the exemplary embodiment relate to a system and method for saliency map prediction as a probability distribution prediction task. A saliency map for an input image is formulated as a generalized Bernoulli distribution. A deep architecture is trained with a loss function which better suits the saliency mapping task than loss functions commonly used for training neural networks for categorization tasks. Several loss functions described herein are based on probability distance measures, including one which is based on the Bhattacharyya distance for multinomial distributions. The selected loss function is paired with a softmax activation function to penalize the distance between predicted and target distributions.

Results of experiments show superior performance with respect to standard regression loss functions such as the Euclidean and Huber loss. Additionally, a saliency map for a large image can be generated in 200 ms using existing GPUs.

The exemplary system and method make use of a trained neural network, specifically, a Convolutional Network (ConvNet), generated by end-to-end learning of deep feed-forward models from raw pixel values. The learned neural network is adapted to the specific task of saliency detection.

Figure 1:
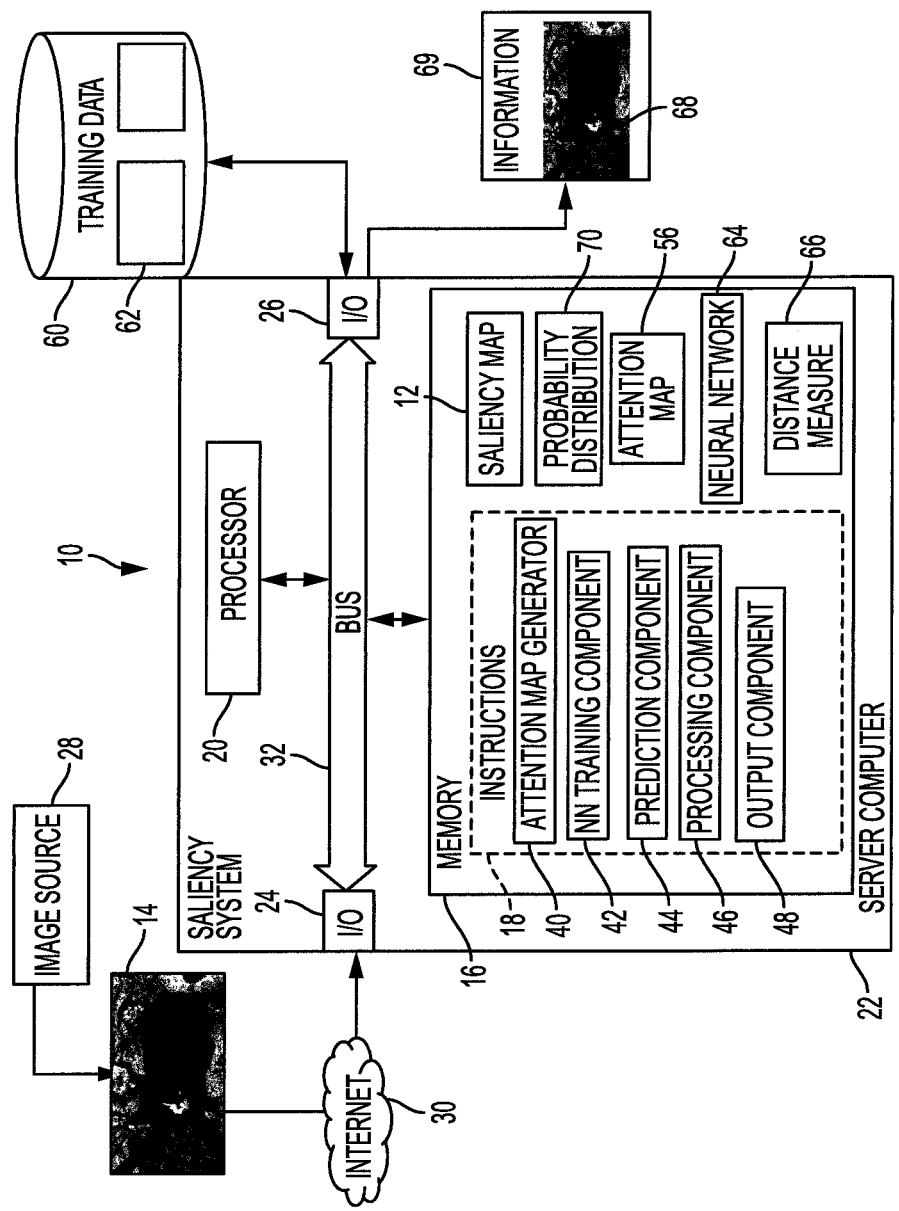
FIG. 1 is a functional block diagram of a system for saliency mapping in accordance with one aspect of the exemplary embodiment.

With reference to FIG. 1, a computer-implemented system 10 for generating a saliency map 12 of an input image 14, is shown. The system includes memory 16 which stores instructions 18 for performing the method illustrated in FIG. 2 and a processor 20 in communication with the memory for executing the instructions. The system 10 may include one or more computing devices 22, such as the illustrated server computer. One or more input/output devices 24, 26 allow the system to communicate with external devices, such as a source 28 of an image, e.g., an image capture device, client computing device, memory story device, or other image source, via wired or wireless links 30, such as a LAN or WAN, such as the Internet. In other embodiments, the system is hosted by an image capture device, such as a camera. The image 14 may be a photographic image or frame of a video sequence that is supplied by the source 28 to the system 10 for processing. Hardware components 16, 20, 24, 26 of the system communicate via a data/control bus 32.

The illustrated instructions 18 include an attention map generator 40, a neural network (NN) training component 42, a prediction component 44, a processing component 46, and an output component 48.

The attention map generator 40 generates an attention map 56 (ground truth saliency map) for each of a set 60 of training images 62.

The NN training component 42 trains a neural network (NN) 64, such as a ConvNet. The neural network includes an ordered sequence of supervised operations (i.e., layers) that are learned on the set 60 of training images 62, and associated attention maps 56. In some embodiments, at least a part of the neural network 64 may be pre-trained on another task, such as categorization. The training component 42 is then used to adapt the (partially) pre-trained neural network to the saliency prediction task. In the exemplary embodiment, this is achieved by representing the attention map and saliency map as probability distributions and computing a distance measure 66 between them. The computed distance is used to update weights of the neural network.

The prediction component 44 uses the trained neural network 64 to generate predictions, in the form of a saliency map 12, for a new, unlabeled image, such as image 14. The saliency map 12 may be used to identify one or more of the most salient region(s) 68 in the image.

The processing component 46 optionally processes the image 14 based on the computed saliency map 12, e.g. crops the image 14 or otherwise extracts information 69 from the image.

The output component 48 outputs information 68, such as the saliency map 12 of the image 14 or other information based thereon.

While the illustrated saliency system 12 is illustrated as both a training system and a saliency prediction system, the system may be implemented as just a training system, which outputs a trained neural network 64, or just a prediction system, which uses the pretrained neural network 64 to predict saliency in an input image.

The computer system 10 may include one or more computing devices 22, such as a PC, such as a desktop, a laptop, palmtop computer, portable digital assistant (PDA), server computer, cellular telephone, tablet computer, pager, image capture device, such as camera 28, combination thereof, or other computing device capable of executing instructions for performing the exemplary method.

The memory 16 may represent any type of non-transitory computer readable medium such as random access memory (RAM), read only memory (ROM), magnetic disk or tape, optical disk, flash memory, or holographic memory. In one embodiment, the memory 16 comprises a combination of random access memory and read only memory. In some embodiments, the processor 20 and memory 16 may be combined in a single chip. Memory 16 stores instructions for performing the exemplary method as well as the processed data 12, 66.

The network interface 24, 26 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor device 20 can be variously embodied, such as by a single-core processor, a dual-core processor (or more generally by a multiple-core processor), a digital processor and cooperating math coprocessor, a digital controller, or the like. The digital processor 20, in addition to executing instructions 18 may also control the operation of the computer 22.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
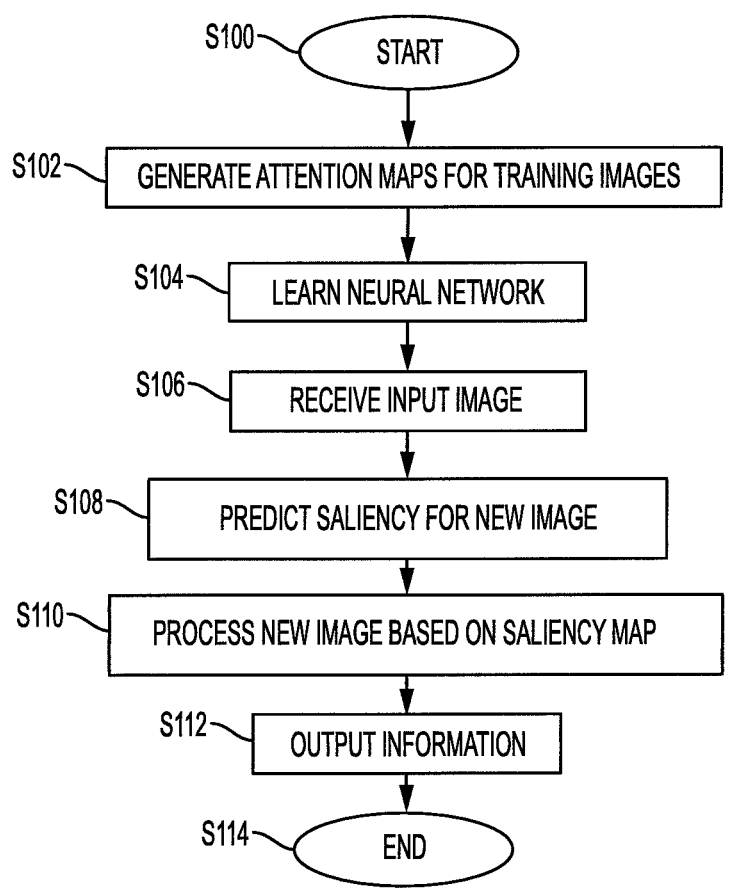
FIG. 2 is a flow chart illustrating a method for saliency mapping in accordance with another aspect of the exemplary embodiment.

FIG. 2 illustrates an exemplary method which may be performed with the system of FIG. 1. The method begins at S100.

Figure 3:
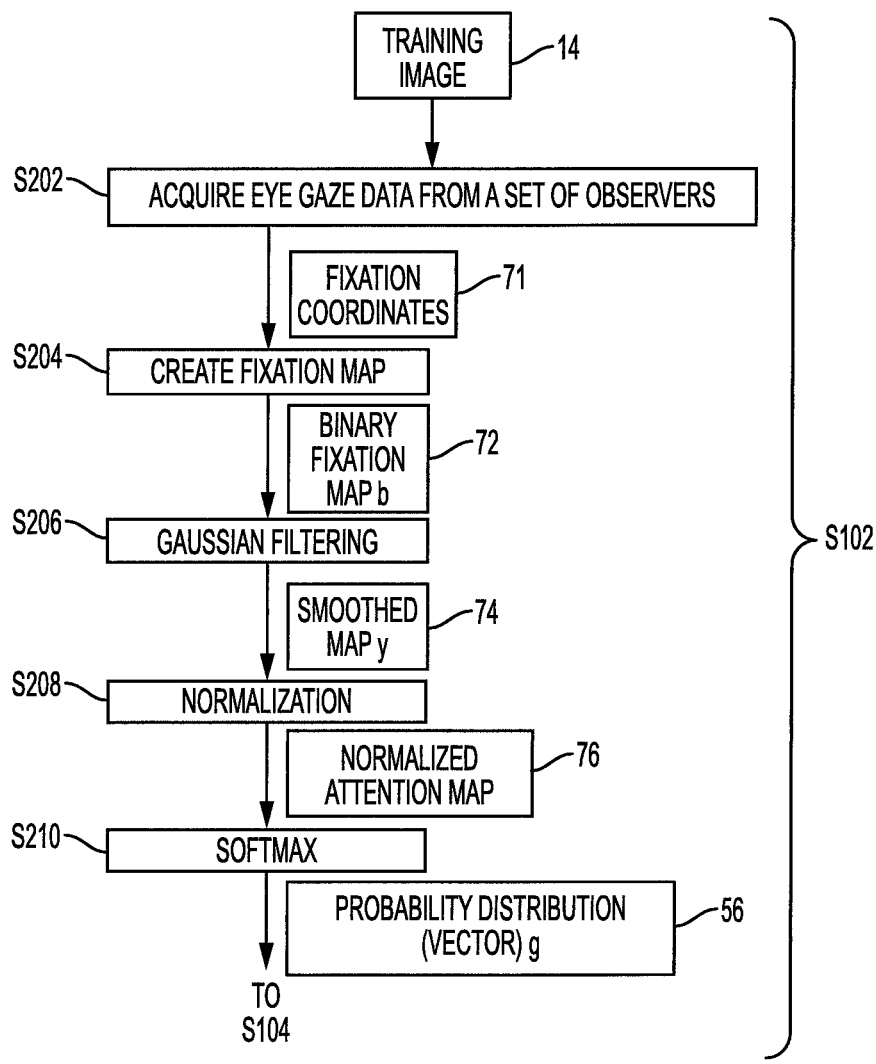
FIG. 3 illustrates generation of an attention map for training a neural network in the method of FIG. 2.

At S102, an attention map 56 is generated for each of a set 60 of training images 62, based on human fixation data, as described in more detail with respect to FIG. 3.

At S104, the neural network 64 is trained on the set of training images 62 and their associated attention maps 56 to predict saliency maps 12 for new images 14. The training includes learning weights for layers of the neural network through backward passes of the neural network, as described in more detail with respect to FIG. 4.

At S106, a new image 14 is received.

At S108, the new image 14 is passed through the pre-trained neural network 64 in a forward direction and the neural network outputs a predicted saliency map 12 in which pixels of the image are assigned probabilities of being in a salient region 68.

At S110, the new image 14 may be processed, e.g., cropped to generate a cropped image including the salient region(s) (regions in which the pixels have a higher probability than other regions) and/or other information extracted from the salient region(s).

At S112, information 69 is output which includes or is based on the saliency map(s) 12 of one or more images.

The method ends at S114.

Figure 4:
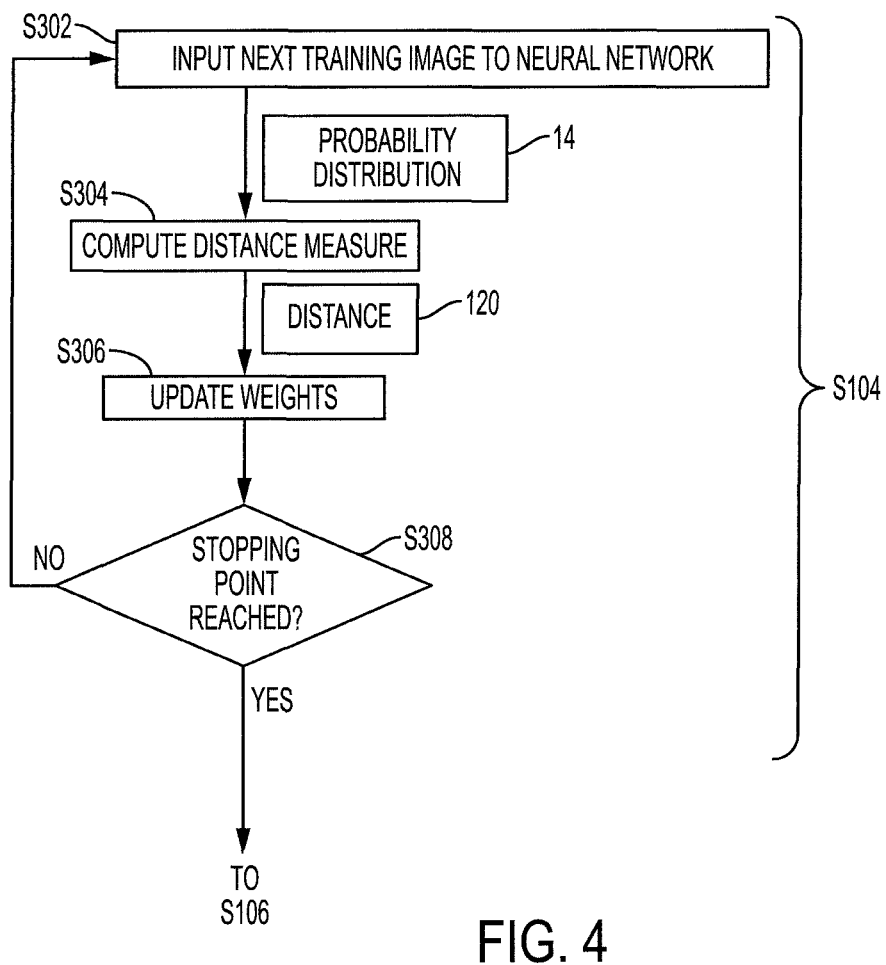
FIG. 4 illustrates training the neural network in the method of FIG. 2.

The method illustrated in FIGS. 2-4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 22, (for example, an internal hard drive of RAM), or may be separate (for example, an external hard drive operatively connected with the computer 22), or may be separate and accessed via a digital data network such as a local area network (LAN) or the Internet (for example, as a redundant array of inexpensive of independent disks (RAID) or other network server storage that is indirectly accessed by the computer 22, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device, or the like. In general, any device, capable of implementing a finite state machine that is in turn capable of implementing the flowchart shown in one or more of FIGS. 2-4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be provided.

Images 14, 62 may be received by the system 10 in any convenient file format, such as JPEG, GIF, JBIG, BMP, TIFF, or the like or other common file format used for images and which may optionally be converted to another suitable format prior to processing. Input images may be stored in memory during processing. Images 14 can be input from any suitable image source 28, such as a workstation, database, memory storage device, such as a disk, image capture device, such as a camera, or the like. In general, each input digital image includes image data for an array of pixels forming the image.

The images 14, 62 may be individual images, such as photographs, video frames, synthetic images, or the like. In one embodiment each image 14, may be a digital photograph expected to include a salient region is expected be visible as a set of pixels of the image. The image data of the image, which is input to the CNN, may include colorant values for each of the pixels in the image, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The exemplary embodiment may also be used for black and white (monochrome) images or for images which have been converted to monochrome for convenient processing.

Saliency Maps as Probability Distributions

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

The aim of the present method is to be able to predict an attention map 56. Given the stochastic nature of the fixations upon which the maps are based, and the fact that the maps are based on aggregated fixations without temporal information, in the exemplary method, a saliency map is modeled as a probability distribution over pixels, where each value corresponds to the probability of that pixel being fixated upon, i.e., as a generalized Bernoulli distribution in the 2D image space.

The generalized Bernoulli distribution is formulated as $p = (p_1, \ldots, p_N)$, the probability distribution 70 over a set of pixels forming an image 14, where $p_i$ is the probability of pixel i being fixated upon and N is the number of image pixels in the image (or a down-sampled version thereof). This simplified formulation allows the use of loss functions amenable to training deep neural network models with back-propagation. Four exemplary loss functions, involving the pairing of the softmax function with probability distance measures, are described herein.

Generating Attention Maps (S102)

Saliency estimation methods have typically sought to model local saliency based on conspicuous cues such as local edges or blob-like structures, or on the scores of binary saliency classifiers trained on fixated and non-fixated image patches. More recently, methods have sought to directly predict maps using pixel-wise regression.

However, visual attention is a fundamentally stochastic process due to it being a perceptual and therefore subjective phenomenon. In an analysis of 300 images viewed by 39 observers, it was found that the fixations for a set of n observers match those from a different set of n observers with an AUC score that increases with the increase in the value of n. (Judd, T., et al., "A Benchmark of Computational Models of Saliency to Predict Human Fixations," *MIT Technical Report*, 2012, hereinafter, "Judd 2012"). Area under the curve is measured as the area under a plot of true positives (y axis) vs false positives (x axis, and thus higher values indicate better performance). The lower bound of human performance was found to be 85% AUC. Therefore there appears to be a high consistency across observers. At the limit of $n \to \infty$, the AUC score is 92%, which can therefore be considered a realistic upper-bound for saliency estimation performance.

As illustrated in FIG. 3, in the exemplary embodiment, ground-truth saliency maps, referred to herein as attention maps 56, are constructed from the aggregated fixations of multiple observers, ignoring any temporal fixation information. Areas with a high fixation density are interpreted as receiving more attention. As attention is thought to be given to a localized region rather than an exact pixel, two-dimensional Gaussian filtering can be applied to a binary fixation map to construct a smooth saliency map. See, for example, Zangemeister, et al., *Visual attention and cognition*. Elsevier, 1996.

For example, at S202, eye gaze data is obtained for a set of observers for each training image (such as at least two observers). Eye gaze data may be obtained by observing the focus of the person's eye on an image, or simulated by receiving mouse clicks on the image made by observers. The collected eye gaze data is combined to generate a set of fixation coordinates 71.

At S204, a binary fixation map 72, denoted b, is generated from the ground-truth eye-fixations 71. For each pixel i of the fixation map:

$$b = \begin{cases} 1, & \text{if fixation at } i \\ 0, & \text{otherwise.} \end{cases} \quad (1)$$

At S206, the binary map b is then convolved (blurred) to approximate the general region fixated on. This can be done with a Gaussian kernel to produce a smoothed map 74, denoted y.

At S208, the smoothed map y is normalized to generate a normalized attention map 76 in which the probabilities range between 0 and 1. Normalization can be computed as:

$$x_i^g = \frac{y_i - \min[y]}{\max[y] - \min[y]}. \quad (2)$$

i.e., the maximum and minimum values max[y] and min[y] are determined over the map y. Each pixel in the normalized attention map 76 is obtained by subtracting the min[y] from the pixel value $y_i$ in the smoothed map and dividing this by the difference between the maximum and minimum values.

At S210, the normalized attention map 76 is converted to an attention map probability distribution 56, denoted g, with a softmax function:

$$g_i = \frac{e^{x_i^g}}{\sum_j e^{x_j^g}}. \quad (3)$$

where $g_i$ is the probability of pixel i being fixated on, which is expressed as a ratio of the exponent of $x_i^g$ to the sum of the exponents for all pixels j in the image, where each $x_i^g$ is the un-normalized saliency response value for pixel i of the groundtruth map ($x^g$). The probability distribution 56 can be expressed as a vector or matrix which includes the probability for each pixel.

The Neural Network

Figure 5A:
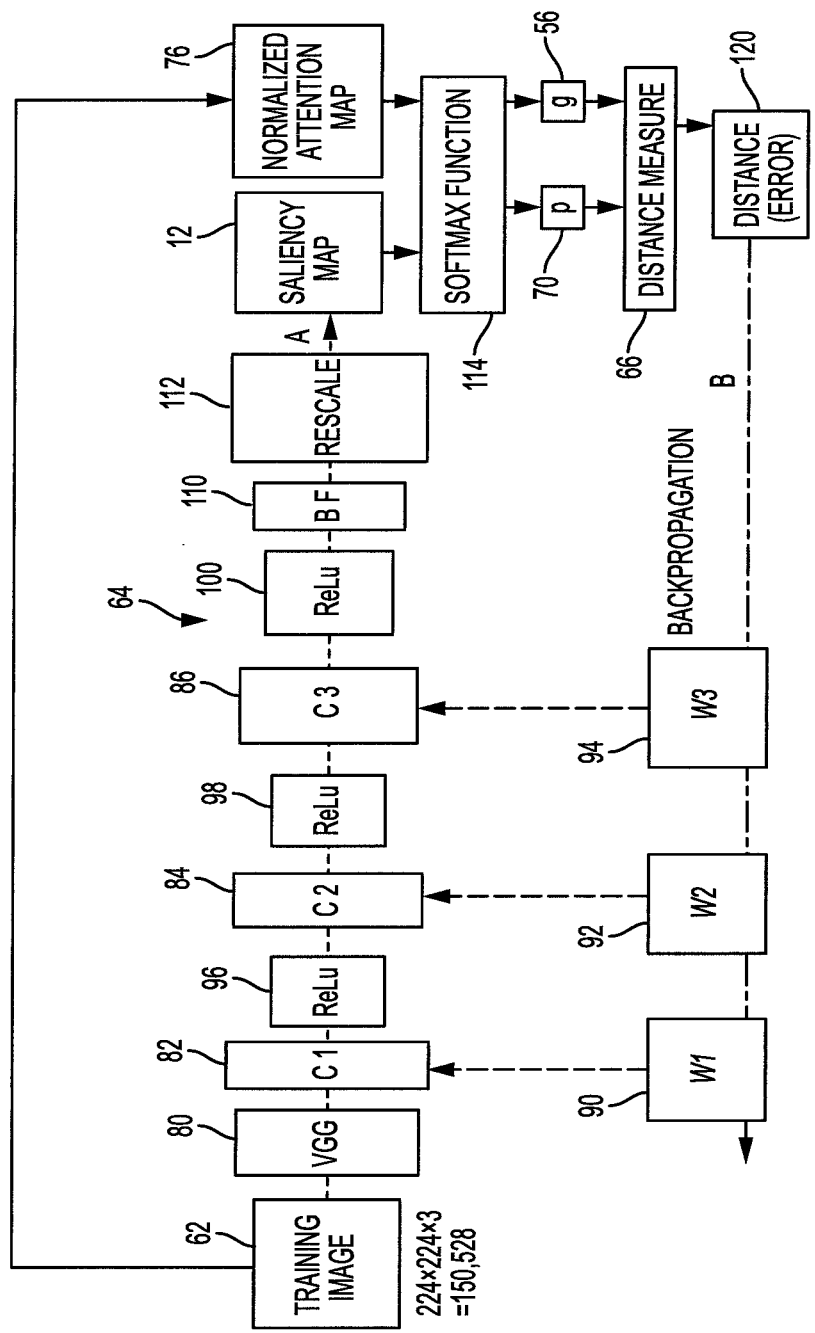
FIG. 5, which is split into FIGS. 5A and 5B for ease of illustration, illustrates a convolutional neural network in accordance with one aspect of the embodiment.
Figure 5B:
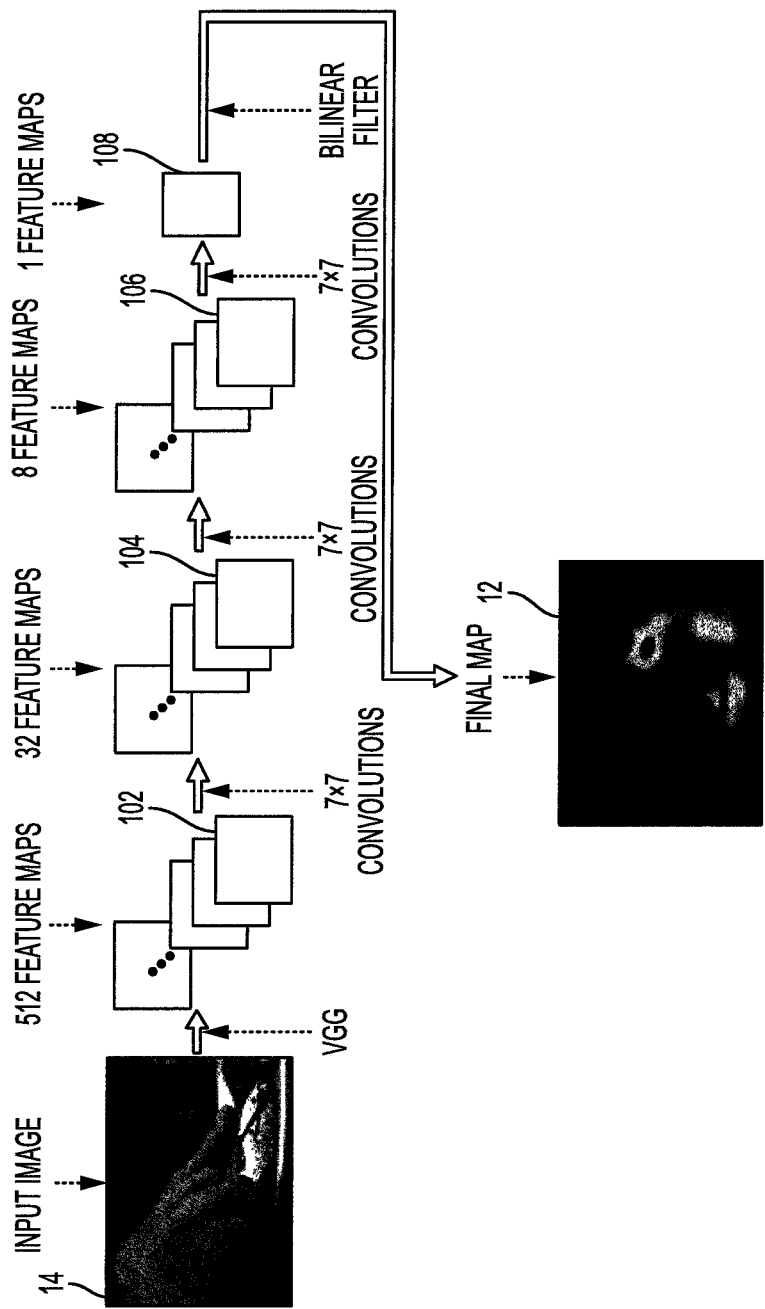
Figure 6:
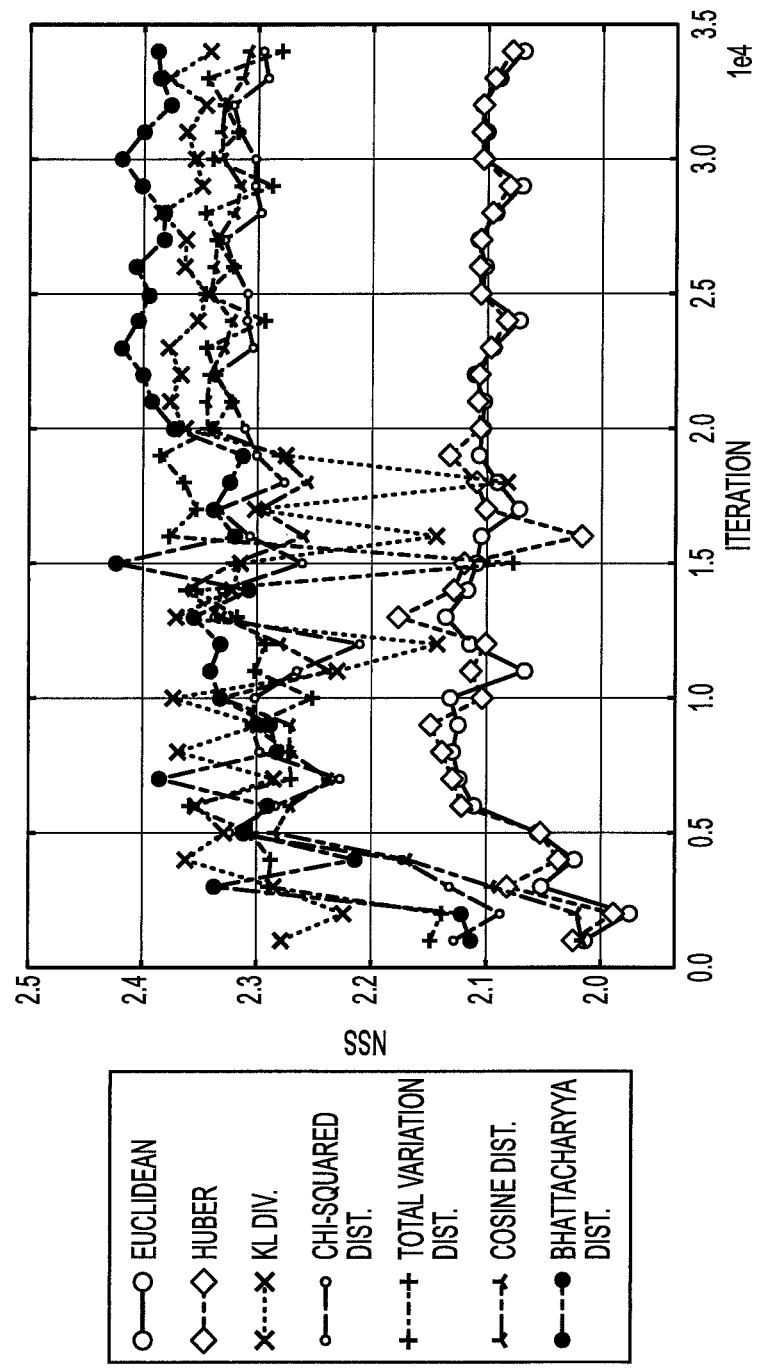
FIGS. 6-9 show the performance of neural networks trained with different metrics as the number of training iterations increases.
Figure 7:
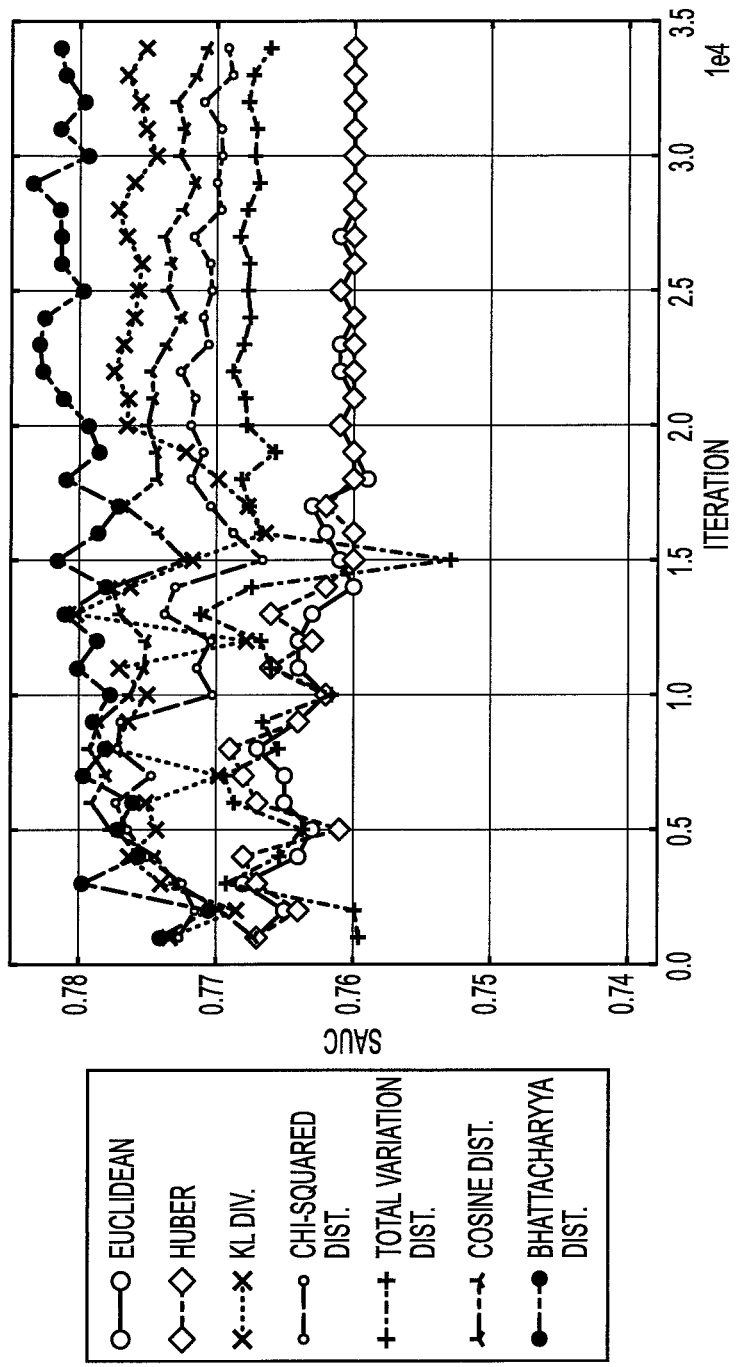
Figure 8:
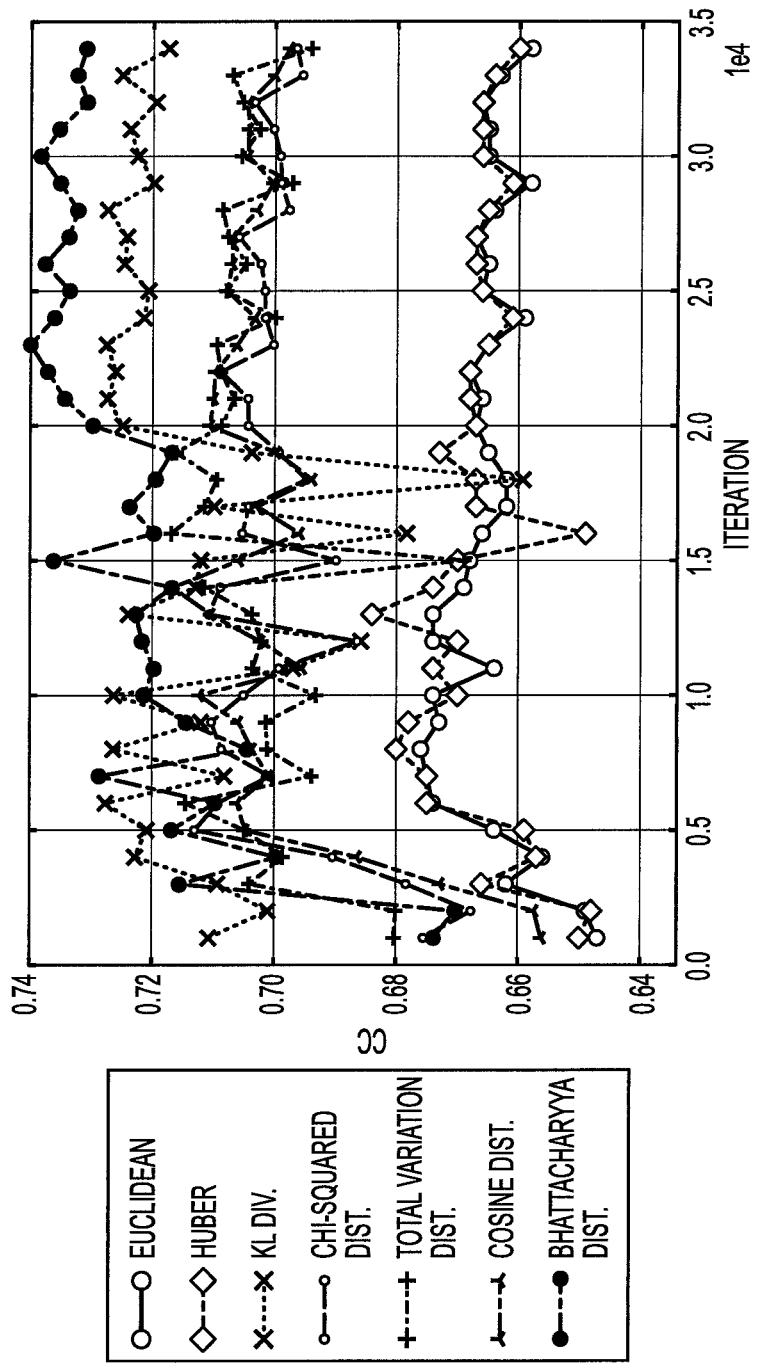
Figure 9:
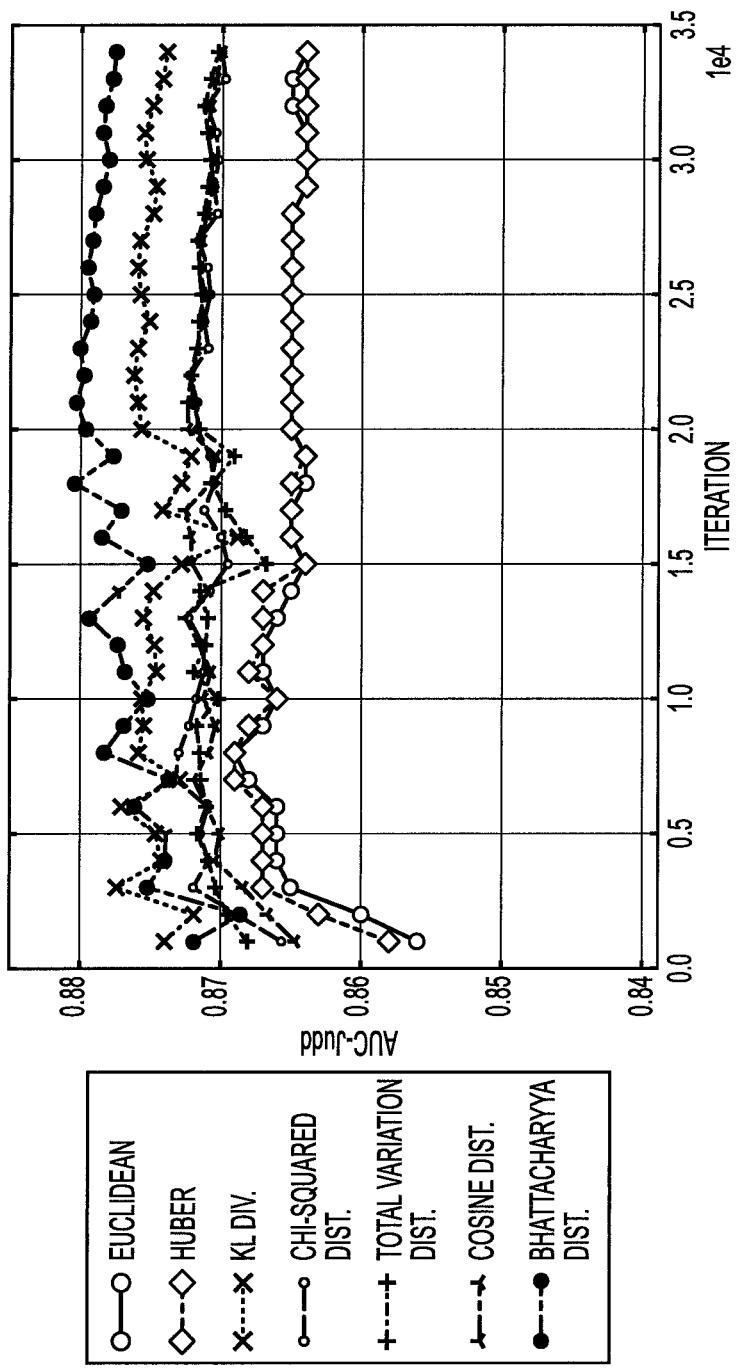

An example network architecture 64 for saliency map extraction is shown in FIGS. 5 (A and B). For the initial layers 80 of the neural network (e.g., from 5-19 layers), the convolutional layers of an existing, pre-trained neural network can be used, which may have been trained for a different task, such as image classification. As an example, the VGGNet model described in Simonyan, K. et al., "Very Deep Convolutional Networks for Large-Scale Image Recognition," *arXiv preprint arXiv*:1409.1556, 2014, hereinafter, Simonyan 2014, may be used. This fully convolutional neural network has thirteen convolutional layers, arranged in five groups. However, other neural networks may be used, such as the Alexnet network, described in A. Krizhevsky, et al., "Imagenet classification with deep convolutional neural networks," NIPS, pp. 1097-105, 2012. Pre-trained CNNs of this type are available online, such the one available on the Visual Geometry Group Homepage, based on Simonyan 2014 (see www.robots.ox.ac.uk/~vgg/research/very_deep/).

In addition to the pre-trained layers 80, the neural network 64 includes a set of additional convolutional layers, such as three (or more) convolutional layers 82, 84, 86, denoted C1 to C3. Each convolutional layer includes of a number of neurons arranged spatially and in "channels" as follows: each neuron of a channel connects to a spatial region (the spatial region which is affected is known as the "receptive field") of neurons of all the channels in the layer below. The values of the weights of these connections are shared by all neurons (for which a neuron response can be interpreted as a convolution). Each convolutional layer 82, 84, 86, etc. is parametrized by a 4D tensor of weights 90, 92, 94, denoted W1-W3, which is essentially a stack of 3D filters.

A non-linear function (such as a Rectified Linear Unit, or ReLU) 96, 98, 100 may be applied to the neuron response—a set of activation maps (or feature maps) 102,

104, 106, 108, each output by a respective convolutional layer 80, 82, 84, 86. The ReLU may assign a value of 0 to all negative values in the activation maps forming the respective response.

The input to the neural network, in the case of color images, is a 3D tensor-having for each pixel, three colorant values (R, G, and B in the illustrated embodiment). In the case of monochrome (black and white images), the image is a 2D tensor. Each convolutional layer is parametrized by a tensor having one more dimension than the image, i.e., a 4D tensor in the case of 3D images. Each tensor, is a stack of 3D filters, where the weights $W_k$, k=1, . . . , 5 represent the parameters of the 4D tensors. During a forward pass of the neural network 64 (in direction A), the filters of the respective layer 80, 82, 84, 86 are run in a sliding window fashion across the output of the previous layer (or the image itself for the first layer of network 80) in order to produce a 3D tensor which is a stack of per-filter activation maps.

For example, in the neural network 64 illustrated in FIG. 5, the input image 14, 62 may be a 3D tensor of size 224×224×3=150,528 pixel values. The first layers may output 512 activation maps 102. The number of activation maps is progressively decreased using the additional convolutional layers, until a final down-sampled saliency map 12 is produced. The final fully-convolutional network may include 16 convolutional layers, each of which is followed by a ReLu layer.

Max-pooling layers (not shown), may be positioned after some or all of the convolutional layers and act on the output of the preceding convolutional layer. The max-pooling layers are layers which compute the maximum value over each receptive field rather than doing a convolution. In the exemplary embodiment, each max-pooling layer moves a window of a few pixels in width and height stepwise across one or more of the output activation maps (in some cases, the windows are overlapping) and assigns to the pixels in each window the maximum value of the pixels in the window. In an exemplary embodiment, the window is 4×4 pixels in size and the step size (or "stride") is one or two pixels, such that the windows are overlapping. The sets of activation maps 102, 104, 106, 108, output by each convolutional layer, in turn (and processed by the RELU and respective max pooling layer, where present), thus pass to the next convolutional layer, respectively, in the sequence. The output 108 of the last convolutional layer 86 is passed through a bilateral filter 110. The resulting map may be resized to that of the attention map, e.g., by upscaling component 112 to produce the saliency map 12.

Although not illustrated, the initial layers 80 may be similarly constructed. While the exemplary neural network includes no fully-connected layers, such layers can be used in some embodiments.

Learning to Predict the Probability of Fixation (S104)

An end-to-end learning method is adopted in which the fully-convolutional network 64 is trained on pairs of training images 62 and ground-truth saliency maps modeled as distributions p and g. The network 64 outputs predicted probability distributions p, while the ground-truth maps g are computed as described above for S102.

Step S104 is illustrated in FIG. 4.

At S302 a training image is passed through the neural network 64. A predicted map p is computed for the training image 62 by the neural network. In particular, for each pixel, $x_i^p$ is computed directly from the last response map 108 of the deep network. Then the probability distribution p, is computed with the soft-max activation function, as for g:

$$p_i = \frac{e^{x_i^p}}{\sum_j e^{x_j^p}}. \quad (4)$$

where each $x_i^p$ is the un-normalized saliency response value generated for pixel i of the predicted map ($x^p$). The softmax results in the probabilities of all pixels summing to 1. The exponential function also introduces some non-linearities.

At S304, a distance measure that is appropriate for probability distributions is used to compute a distance (error) 120 between the probability distributions p and g for the training image. In the exemplary embodiment, for training, g is downsampled to match the dimensions of the down-sampled probability distribution p. For generation, however, p is up-sampled to the original image dimension and normalized using the softmax function.

An objective function is constructed to minimize the distance (error) 120 between the probability distributions p and g over all training images, which is used for training the network. The objective function may be optimized by iteratively updating the weights of the layers, e.g., to identify the weights that minimize over all training images:

$$\text{argmin}_{\text{alltraining images}} \sum (\text{error} + rp)$$

where rp is an optional regularization parameter, which can be a function of the error.

In particular, at S306, the weights W1, W2, W3 of the layers are updated by backpropagating the derivative with respect to the error 120 in the direction of arrow B.

At S308, if a stopping point is reached, the training ends, otherwise the method returns to S302 for the next image. The stopping point may be reached after a number of iterations or when no improvement in the objective function is achieved.

The combination of the softmax function with the distance measure 66 is similar to the softmax/cross-entropy loss pairing which is often used to train models for multinomial logistic regression.

In the present case, the probability distance measure can be selected from the $X^2$, total-variation, cosine, and Bhattacharyya distance measures, and the KL divergence measure, the minimization of which is equivalent to cross-entropy minimization. These combinations are used to train the network for probability distribution prediction. The formulations of these distance measures L(p,g) are shown in Table 1, together with the partial derivative $$\frac{\partial L(p)}{\partial x_i^p},$$

which is used to modify the weights W1, W2, W3 of the layers 82, 84, 86 in backpropagation (and optionally also the weights of some or all of the layers in the initial network 80). The partial derivatives of these loss functions with respect to $p_i$ are all of the form $-a(1-p_i)+bp_i$ due to the pairing with the softmax function 114, whose partial derivative with respect to $x_i^p$ is:

$$\frac{\partial p_i}{\partial x_j^p} = \begin{cases} p_i(1-p_i), & \text{if } i=j \\ -p_i p_j, & \text{otherwise} \end{cases}. \quad (5)$$

TABLE 1

Probability distance measures and their derivatives used for stochastic gradient descent with back-propagation

| Probability distances | $L(p, g)$ | $\dfrac{\partial L(p, g)}{\partial x_i^p}$ |
|---|---|---|
| $\chi^2$ divergence | $\sum_j \dfrac{(g_j)^2}{p_j} - 1$ | $p_i \sum_{j \neq i} \dfrac{g_j^2}{p_j} - \dfrac{g_i^2}{p_i}(1 - p_i)$ |
| Total Variation distance | $\dfrac{1}{2}\sum_j |g_j - p_j|$ | $\dfrac{1}{2}\left[ p_i \sum_{j \neq i} \dfrac{g_j - p_j}{|g_j - p_j|} p_j - p_i \dfrac{g_i - p_i}{|g_i - p_i|}(1 - p_i) \right]$ |
| Cosine distance | $1 - \dfrac{\sum_j p_j g_j}{\sqrt{\sum_j p_j^2}\sqrt{\sum_j g_j^2}}$ | $\dfrac{1}{2}\left[ p_i \sum_{j \neq i} p_j \left( g_j - p_i \dfrac{\sqrt{\sum_i g_i^2}}{\sqrt{\sum_i p_i^2}} R \right) - p_i(g_i - p_i R)(1 - p_i) \right];$ where $R = \dfrac{\sum_i p_i g_i}{C}$ and $C = \sqrt{\sum_i p_i^2}\sqrt{\sum_i g_i^2}$ . |
| Bhattacharyya distance | $-\ln \Sigma_j (p_j g_j)^{0.5}$ | $\dfrac{-1}{2\sum_j (p_j g_j)^{0.5}}\left[ p_i \sum_{j \neq i} (p_j g_j)^{0.5} - (p_i g_i)^{0.5}(1 - p_i) \right]$ |
| KL divergence | $\sum_j g_j \log \dfrac{g_j}{p_j}$ | $p_i \Sigma_{j \neq i} g_j - g_i(1 - p_i)$ |

Where $p_i$ and $p_j$ are probability values from the first probability distribution p' for a pixel i and a pixel j and $g_i$ and $g_j$ are probability values from the second probability distribution g' for the pixels i and j.

As saliency datasets tend to be too small to train a large network neural network from random initializations (the largest publically available dataset has 15,000 images, compared to 1M for ImageNet), it is useful to initialize with a pre-trained network 80, even though the task is different. The remaining three layers 82, 84, 86 may be initialized with a uniform Gaussian distribution of sigma=0.01.

The objective function may be optimized using stochastic gradient descent. A higher learning rate may be used for the newly-introduced layers 82, 84, 86 than for the pre-trained layers 80, at least initially, so that the weights for the new layers can be learnt more quickly. In some embodiments, the weights of some or all of the pre-trained layers 80 remain fixed.

Predicting Saliency (S108)

Given a new image 14, for which a saliency map is to be predicted, the image is passed through the pre-trained neural network 64, to generate a saliency map 12, 70.

Further Processing (S110)

The processing component 46 may extract information from a salient region 68 of the image 14, based on the saliency map 12. For example, the saliency map can be used to identify pixels of the image having at least a threshold predicted saliency. A region 68 containing these pixels (optionally enlarged to create a regular shape such as a bounding box or otherwise extended in one or both dimensions) may be labeled as a salient region and information extracted therefrom.

The output of the system can be the saliency map 12 or 70, a salient region 68 of the image or other information which is generated based on the saliency map, which may depend on the application.

The system and method find application in real-time image and video analytics in the fields of transportation, retail, and healthcare businesses. For example, the method can be used for fast localization of products in images of store shelves; in High-Occupancy-Vehicle (HOV) detection systems for detecting windscreens in images of cars; identifying license plates of vehicles for license plate recognition systems in toll booth and parking applications; locating people and vehicles for tracking systems. These and other applications can benefit from an improved region-of-interest locator that focuses the costly high-level visual processing on the relevant scene locations. The method is less computationally expensive (once the neural network has been learned) than many existing methods, which is particularly advantageous when a large number of images need to be processed in a relatively short time period.

The salient regions detected in a first, attentional filtering stage can be either discretized into "interest points" and used for pattern matching and representations (e.g., in retail for product search), or used to restrict the subsequent expensive processing (such as the exhaustive pattern search through a sliding window) to the task-relevant image regions (e.g., in object detection). Especially in video analytics tasks, where adding another spatio-temporal dimension greatly increases the number of pixels that need to be processed, such a selective processing is very useful. Video-based vehicle occupancy estimation, parking management, patient monitoring in healthcare, and client tracking and waiting time estimation in retail can all benefit from the detection of salient regions.

Without intending to limit the scope of the exemplary embodiment, the following examples illustrate the application of the method.

Examples

The network architecture for saliency map extraction is as shown in FIG. 5. For the initial layers of the neural network, the convolutional layers of the VGGNet model described in Simonyan, K. et al., "Very Deep Convolutional Networks for Large-Scale Image Recognition," *arXiv preprint arXiv:* 1409.1556, pp. 1-14, 2014, are used. These layers were trained on ImageNet images for the task of classification. This convolution sub-network has been shown to provide good local feature maps for a variety of different tasks including object localization and semantic segmentation. As saliency datasets tend to be too small to train such large networks from random initializations (the largest publically available dataset has 15,000 images, compared to 1M for ImageNet), it is useful to initialize with such a pre-trained network, even though the task is different. The remaining three layers are initialized with a uniform Gaussian distribution of sigma=0.01. The number of feature maps is progressively decreased using additional convolutional layers, until a final down-sampled saliency map is produced. The final fully-convolutional network comprises 16 convolutional layers, each of which is followed by a ReLu layer.

The objective function is optimized using stochastic gradient descent, with a learning rate of 1 times the global learning rate for newly-introduced layers and 0.1 times the global learning rate for those layers which have been pre-trained on ImageNet. To reduce training time, the first four convolutional layers of the VGG network were not trained and retained their pre-trained values. A momentum of 0.9 and a weight decay of 0.0005 were used. The model is implemented in Gaffe (Jia, Y., et al., "Gaffe: Convolutional Architecture for Fast Feature Embedding," *Proc. ACM Int'l Conf. on Multimedia*, pp. 675-678, 2014). The network was trained using an Nvidia K40 GPU. Training on the SALICON dataset took 30 hours.

Saliency datasets tend to have both semantic biases and idiosyncrasies related to the complexity of collecting eye-tracking information (such as the viewing distance to the screen and the eye-tracker calibration). In addition, the SALICON dataset collected mouse-click in lieu of actual eye-fixations, leading to a domain shift. Therefore it would be beneficial to fine-tune the network for each dataset of interest, or at least for actual eye-fixation data. However all public eye-fixation datasets, such as MIT-1003 and MIT-300, described below, have a limited number of images, ranging from 300 to 2000. Accordingly a limited fine-tuning was performed with the public eye-fixation datasets, which appears to adjust the weights to equalize the histograms between predicted and ground-truth maps better. A detailed description of each of these datasets follows.

1. Datasets

This following image datasets used were used for training and evaluating the saliency prediction models.

SALICON: This is one of the largest saliency datasets available in the public domain (see, Jiang 2015). It includes eye-fixation information for 20000 images from the MS-COCO dataset (see, Lin, T.-Y., et al., "Microsoft COCO: Common objects in context," *ECCV*, pp. 740-755, 2014). These images are a diverse mixture of indoor and outdoor scenes and display a range of scene clutter. 10,000 of these images are marked for training, 5000 for validation and yet another 5000 for testing. The fixation data for the test set is held-out and performance on it is evaluated on a remote server. The SALICON dataset relies on cursor clicks on the objects of interest for fixation gathering. The processing focus (foveation) in the human attention mechanism that lies behind saliency fixations is simulated using mouse-movements over a blurred image. The approximate foveal image region around the mouse position is selectively un-blurred as the user explores the image scene using the mouse cursor.

As evaluated on a subset of the dataset this mouse based model is closer to the human performance (at 0.89 sAUC) than existing computational models. While the mouse fixation data is still an approximation to the human baseline, it is useful in adapting the weights of a deep network originally trained on a distinct task to the new task of saliency prediction. This dataset was used for a comparison of the selected probability distances as loss functions during learning.

OSIE: This benchmark dataset is a set of 700 images. These include natural and outdoor scenes as well as some aesthetic pictures taken from Flickr and Google. In order to gain from top-down understanding, this dataset provides object and semantic level information along with the eye-tracking data. The set was randomly divided into 500 training and 200 test images. The results are averaged over a 10-fold cross validation.

MIT-1003: This dataset was introduced as part of the training and testing method in Judd 2009. The eye tracking data is collected using a head-mounted eye tracking device for 15 different viewers. The 1003 images of this dataset cover natural indoor and outdoor scenes. Of these, the first 900 images were used for training and the remaining 103 for validation, similar to the method of Kruthiventi, S. S. S., et al., "DeepFix: A Fully Convolutional Neural Network for predicting Human Eye Fixations," Technical report, arXiv: 1510.02927, pp. 1-11, 2015, hereinafter, "Kruthiventi 2015".

MIT-300: This benchmark includes held-out eye tracking data for 300 images collected across 39 different viewers (see, Judd 2012). The data collection method for this dataset is very similar to that used in MIT-1003. Hence, as suggested on the online benchmark, the MIT-1003 set was used as the training data and the MIT-300 set for fine-tuning. Fine-tuning is particularly useful because the mouse based fixations used for pre-training are still an approximate match to the human eye fixations. As shown on a subset of the SALICON images, the image level performance can vary from a low of sAUC of 0.655 to a high of sAUC of 0.965 (Jiang 2015).

Results

Results for different loss functions and for a comparison to other methods were obtained. The evaluation protocol of Judd 2012 was used and results are reported using common saliency metrics: shuffled-AUC (sAUC), AUC-Judd, AUC-Borji, Correlation Coefficient (CC), Normalized Scanpath Saliency (NSS), Similarity (SIM), and Earth Mover's Distance (EMD).

1. Loss Functions

The performance of neural network models trained using the exemplary loss functions and standard loss functions based on the Euclidean distance, Huber distance, and KL-divergence was evaluated.

The Euclidean and Huber regression loss are defined as:

$$L_{euc}(p,g)=\Sigma_j a_j^2; \text{ and } L_{hub}(p,g)=\Sigma_j \{\tfrac{1}{2}a_j^2, \text{ for } |a_j|\leq 1, \text{ and } |a_j|-\tfrac{1}{2}, \text{ otherwise};$$

where $a_j=|p_j-g_j|$, and using p to denote the predicted distribution.

These models were all trained on the SALICON training set of 10,000 images, and validated on the SALICON validation set of 5000 images. The results in Table 2 show that: (i) the losses based on distance measures appropriate for probability distributions perform better than standard regression losses; (ii) the KL-divergence compares favorably with other methods; and (iii) the Bhattacharyya distance-based loss outperforms all other losses. The KL-divergence and Bhattacharyya distance-based loss are both robust to outliers as they suppress large differences between probabilities (logarithmically in the case of the KL divergence and geometrically in the case of the Bhattacharyya distance). This robustness is particularly useful as the ground-truth saliency maps are derived from eye-fixations which have a natural variation due to the subjectivity of visual attention, and which may also contain stray fixations and other noise.

TABLE 2

SALICON validation set: Performance comparison of models using different loss metrics

| Distance | AUC-Judd | sAUC | CC | NSS |
|---|---|---|---|---|
| Euclidean | 0.865 | 0.761 | 0.667 | 2.108 |
| Huber | 0.867 | 0.766 | 0.684 | 2.177 |
| KL divergence | 0.876 | 0.780 | 0.724 | 2.371 |
| $\chi^2$ divergence | 0.872 | 0.774 | 0.711 | 2.337 |
| Total Variation distance | 0.869 | 0.766 | 0.716 | 2.385 |
| Cosine distance | 0.871 | 0.778 | 0.717 | 2.363 |
| Bhattacharyya distance | 0.880 | 0.783 | 0.740 | 2.419 |

FIGS. 6-9 show the evolution of the different metrics on the SALICON validation set as the number of training iterations (batches of images) increases. The Bhattacharyya distance is consistently the best-performing.

2. Comparison with Other Methods for Predicting Saliency

The SALICON Challenge is a saliency estimation challenge (Zhang, Y., et al., "Large-scale Scene Understanding Challenge: Eye Tracking Saliency Estimation," June 2015, downloaded at http://lsun.cs.princeton.edu/leaderboard/#saliencysalicon). The challenge involves predicting saliency maps for 5000 images held out from the SALICON dataset. The following methods were compared with the present method of probability distribution prediction (PDP):

1. ITTI: described in Itti, L, et al., "A model of saliency-based visual attention for rapid scene analysis," *TPAMI*, (11):1254-1259, 1998.
2. GBVS: described in Harel, J., et al., "Graph-based visual saliency," *NIPS*, pp. 545-552, 2006.
3. BMS: described in Zhang, J., et al., "Saliency detection: A boolean map approach," *ICCV*, pp. 153-160, 2013.
4. UPC: described in Pan, J., et al., "End-to-end Convolutional Network for Saliency Prediction," Technical report, arXiv:1507.01422, pp. 1-6, 2015.
5. WHU_IIP, Xidian, and Rare12_Improved: there is no associated publication for these results.
6. eDN: described in Vig, E., et al., "Large-scale optimization of hierarchical features for saliency prediction in natural images," *CVPR*, pp. 2798-2805, 2014.
7. SUN: described in Zhang 2015.
8. SALICON: described in Huang, X., et al., "SALICON: Bridging the Semantic Gap in Saliency Prediction," *ICCV*, pp. 262-270, 2015.
9. DeepFix: described in Kruthiventi 2015.
10. Signature: described in Hou, X., et al., "Image signature: Highlighting sparse salient regions" *TPAMI*, 34(1) pp: 194-201, 2012.
11. LCQS-baseline: described in Luo, Y., et al., "Label Consistent Quadratic Surrogate Model for Visual Saliency Prediction," *CVPR*, pp. 5060-5069, 2015.

Table 3 shows results for some of the other methods and the present method (PDP) without fine tuning. PDP outperforms published results on this dataset across all three metrics.

TABLE 3

SALICON Challenge: comparison between different methods without fine tuning

| Method | CC | sAUC | AUC-Borji |
|---|---|---|---|
| ITTI | 0.205 | 0.610 | 0.660 |
| GBVS | 0.421 | 0.630 | 0.782 |
| BMS | 0.427 | 0.694 | 0.770 |
| WHU_IIP | 0.457 | 0.606 | 0.776 |
| Xidian | 0.481 | 0.681 | 0.800 |
| Rare12_Improved | 0.511 | 0.664 | 0.805 |
| UPC | 0.596 | 0.670 | 0.8291 |
| PDP | 0.765 | 0.781 | 0.882 |

The results for the present method and some of the other methods were also compared after fine tuning on the following datasets:

MIT-300: MIT-1003 images serve as the training set for fine-tuning to this benchmark. The results are compared in Table 4. It should be noted that the DeepFix method of Kruthiventi 2015 incorporates external cues, such as center and horizon biases in their models. Including such cues may also improve the present model 64. In addition, Kruthiventi 2015 uses a larger architecture, trained with a regression loss. The fine-tuning on the MIT-1003 dataset could not be done in a batch mode due to the variable image sizes. It was observed that a much reduced momentum of 0.70 boosted the stability and smooth learning of the model.

TABLE 4

MIT 300: comparison of fine-tuned methods

| Method | AUC-Judd | SIM | EMD | AUC-Borji | sAUC | CC | NSS |
|---|---|---|---|---|---|---|---|
| eDN | 0.82 | 0.41 | 4.56 | 0.81 | 0.62 | 0.45 | 1.14 |
| BMS | 0.83 | 0.51 | 3.35 | 0.82 | 0.65 | 0.55 | 1.41 |
| SALICON | 0.87 | 0.60 | 2.62 | 0.85 | 0.74 | 0.74 | 2.12 |
| DeepFix | 0.87 | 0.67 | 2.04 | 0.80 | 0.71 | 0.78 | 2.26 |
| PDP | 0.85 | 0.60 | 2.58 | 0.80 | 0.73 | 0.70 | 2.05 |

The results in Table 4 show that the PDP method performs well, even against methods which are very complex to learn.

OSIE Benchmark: The performance comparison over this dataset is done in a 10-fold cross validation manner by randomly dividing the dataset into 500 training and 100 validation images. Table 5 shows that PDP gives the highest score of sAUC. This dataset contains variety in terms of the aesthetic images collected online in addition to the natural images of indoor and outdoor scenes. Using a small set of only 500 images, the model can swiftly adapt to the new data.

TABLE 5

OSIE: The performance metric of shuffled AUC (sAUC) is averaged across 10-fold cross validation

| Method | sAUC |
|---|---|
| Itti | 0.658 |
| SUN | 0.735 |

TABLE 5-continued

OSIE: The performance metric of shuffled AUC (sAUC)
is averaged across 10-fold cross validation

| Method | sAUC |
|---|---|
| Signature | 0.749 |
| GBVS | 0.706 |
| LCQS-baseline | 0.765 |
| PDP | 0.797 |

Figure 10:
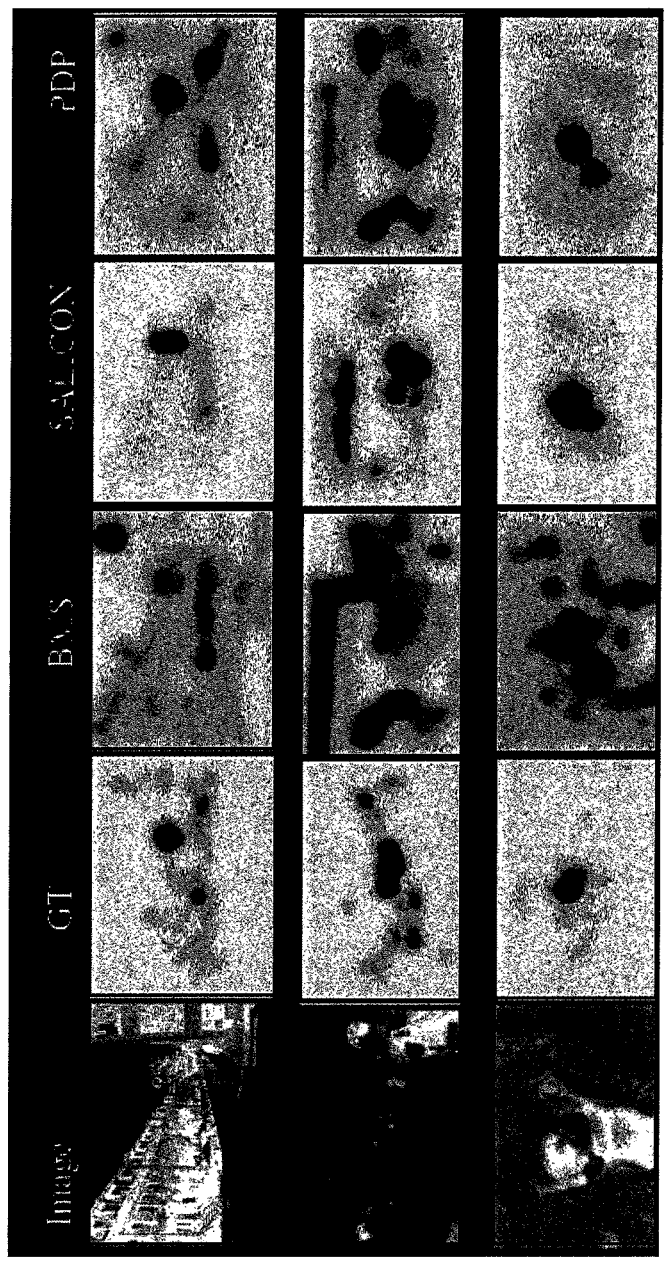
FIG. 10 shows example saliency maps obtained with different methods.

FIG. 10 illustrates predicted saliency maps obtained by different methods using images from MIT1003 (GT indicates the ground truth attention map). The present method consistently gives high fixation probabilities to areas of high center-surround contrast, and also to high-level cues such as bodies, faces and, to a lesser extent, text. This is likely due to the large number of images containing people and faces in the SALICON dataset.

GT stands for the ground-truth saliency maps. Note that the PDP results shown here were obtained from a network that was trained only on SALICON images, with no fine-tuning to this dataset.

Figure 11:
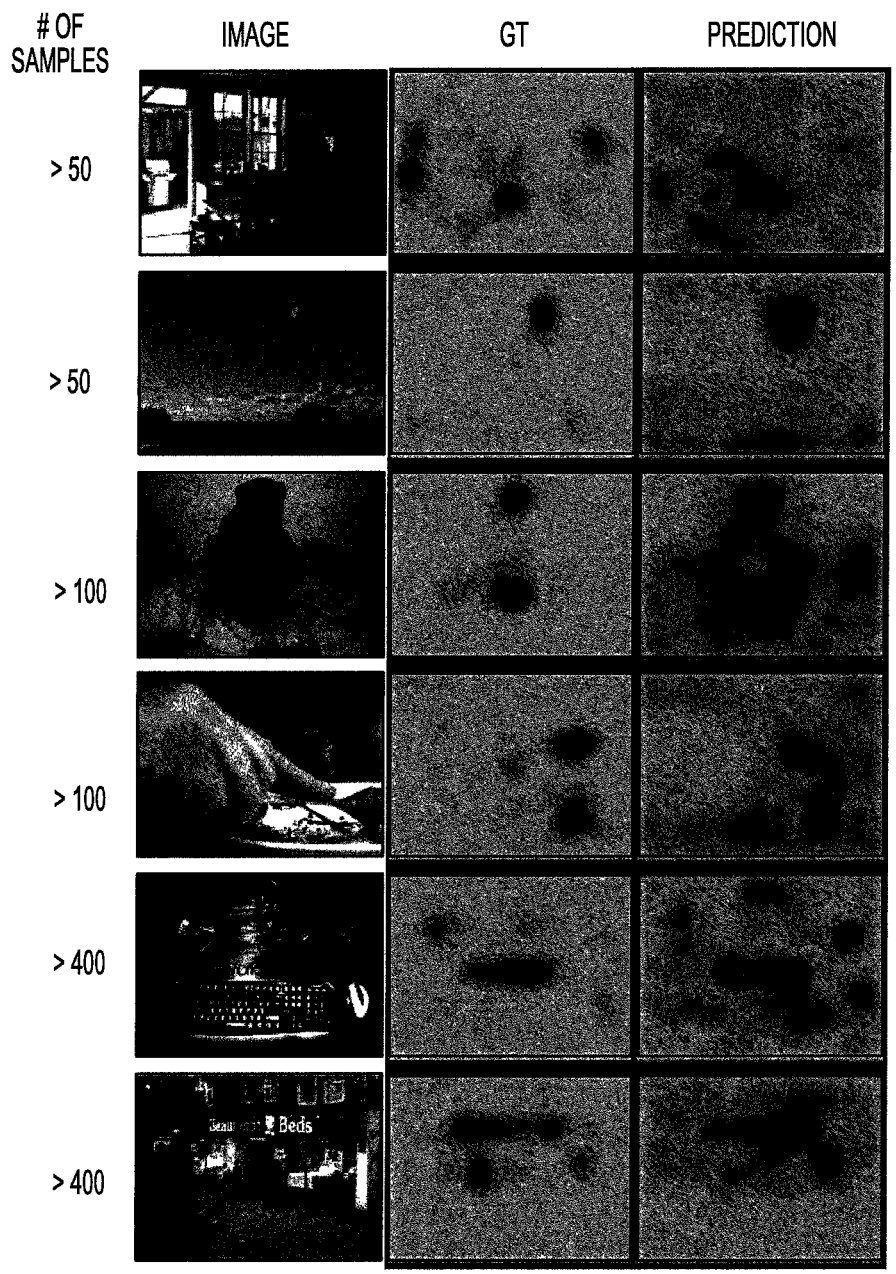
FIG. 11 shows saliency map predictions for SALICON training images obtained on the forward pass after a given number of training images had been used to train the present model.

FIG. 11 shows saliency map predictions for SALICON training images which were obtained on the forward pass after a given number of training images had been used to train the present model 64. It can see that center-surround contrast cues are learned very quickly, after having seen fewer than 50 images. Faces (both of animate and non-animate objects) are also learned quickly, having seen fewer than 100 images. Text is also learned fairly quickly. However, the cue is not as strongly identified, likely due to the relatively smaller amount of training data involving text.

The experimental validation on four datasets demonstrates the effectiveness the method when compared to other approaches to saliency map generation.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating a system for predicting saliency in an image, comprising:
   for each of a set of training images:
      generating an attention map; and
      representing the attention map as a first probability distribution which includes, for each of a set of pixels, a respective value corresponding to a probability of the pixel being fixated upon; and
   with a processor, training a neural network to output a saliency map for an input image, the training including updating parameters of the neural network to optimize an objective function over the training set, the objective function being based on a distance measure computed between a second probability distribution computed for a saliency map output by the neural network, given an input training image, and the first probability distribution computed for the attention map of the respective training image, the second probability distribution including, for each of the set of pixels, a respective probability.

2. The method of claim 1, wherein the generation of the attention map comprises:
   acquiring eye gaze data for a set of observers observing the training image;
   generating a binary fixation map based on the eye gaze data; and
   smoothing the binary map.

3. The method of claim 1, wherein the probability distributions are computed with a softmax function.

4. The method of claim 1, wherein the distance measure is selected from the $X^2$ distance, the total-variation distance, the cosine distance, and the Bhattacharyya distance.

5. The method of claim 4, wherein the distance measure is the Bhattacharyya distance.

6. The method of claim 1, wherein the training of the neural network includes updating weights of convolutional layers of the neural network as a function of a derivative of the distance measure.

7. The method of claim 1 wherein the neural network is a fully-convolutional neural network.

8. The method of claim 1, wherein the training includes receiving layers of a pretrained neural network, adding additional layers, and updating weights of at least the additional layers.

9. The method of claim 1, wherein the neural network includes at least five layers, each layer outputting a set of activation maps.

10. The method of claim 1, wherein at least some of the eye gaze data is acquired from mouse clicks on the training images.

11. The method of claim 1, further comprising predicting a saliency map for a new image with the trained neural network.

12. The method of claim 11, further comprising outputting information based on the predicted saliency map.

13. A system comprising memory which stores instructions for performing the method of claim 1 and a processor in communication with the memory which executes the instructions.

14. A computer program product comprising a non-transitory storage medium storing instructions, which when executed by a computer, perform the method of claim 1.

15. A training system for generating a prediction system for predicting saliency in an image, comprising:
   memory which stores an attention map for each of a set of training images, the attention map having been generated based on eye gaze data, the attention map being modeled as a first probability distribution which includes, for each of a set of pixels, a respective value corresponding to a probability of the pixel being fixated upon;
   a training component which trains a neural network with the training images and the attention maps by optimizing an objective function over the training set, the objective function being based on a distance measure computed between a second probability distribution computed for a saliency map output by the neural network, when input with a training image, and the first probability distribution for the respective training image; and
   a hardware processor which implements the training component.

16. The training system of claim 15, further comprising an attention map generator which generates the attention map for each of the set of training images.

17. A method for predicting saliency in an image, comprising:
   providing a trained neural network trained by a method comprising:

generating an attention map for each of a set of training images, modeling each attention map as a first probability distribution which includes, for each of a set of pixels, a respective value corresponding to a probability of the pixel being fixated upon, and training a neural network to output a saliency map for an input image, the training comprising updating parameters of the neural network to optimize an objective function over the training set, which is based on a distance measure computed between the first probability distribution for the attention map and a second probability distribution computed for a saliency map output by the neural network for the respective training image, the second probability distribution including, for each of the set of pixels, a respective probability;

receiving an image; and passing the image through the neural network to generate a saliency map for the image.

18. The method of claim 17, further comprising extracting information from a salient region of the image based on the saliency map.

19. The method of claim 17, further comprising outputting the saliency map or information based thereon.

* * * * *